Aug. 7, 1962 C. E. HITTLE 3,048,754
COMBINATION MOTOR CONTROL SYSTEM
Filed June 30, 1959 2 Sheets-Sheet 1
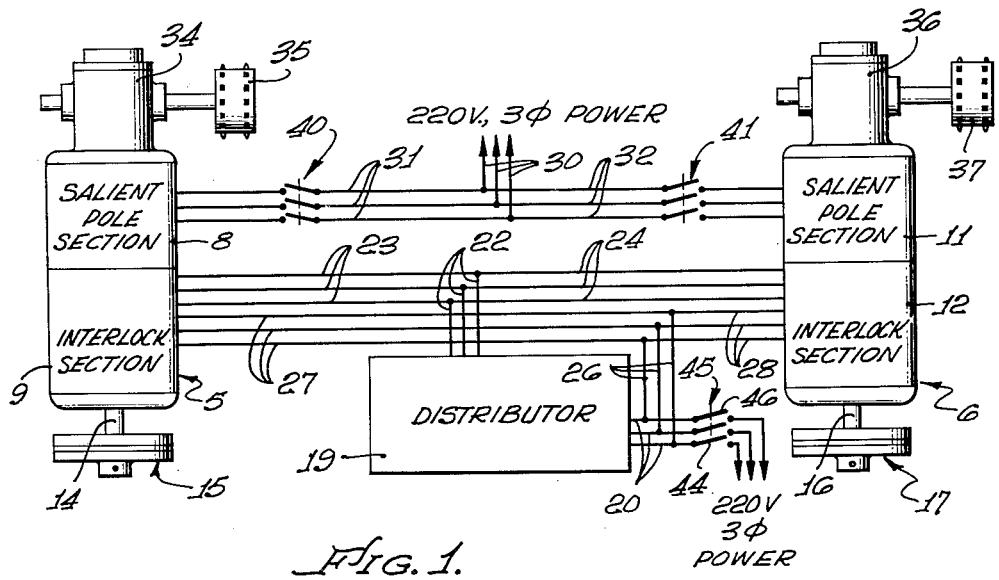
Fig. 1.
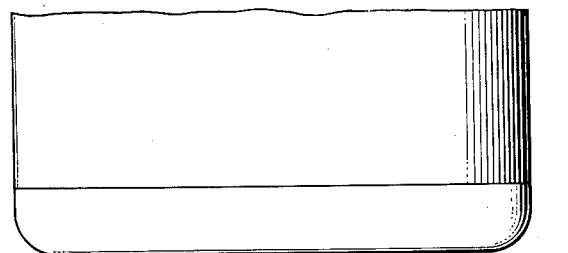
Fig. 2.
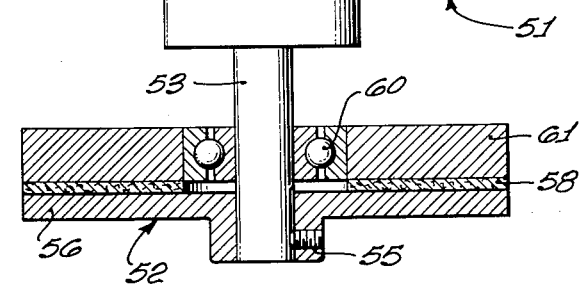
CARL E. HITTLE
INVENTOR.
BY
ATTORNEY.

Aug. 7, 1962   C. E. HITTLE   3,048,754
COMBINATION MOTOR CONTROL SYSTEM
Filed June 30, 1959   2 Sheets-Sheet 2

A TYPICAL SALIENT POLE MOTOR
B TYPICAL SALIENT POLE MOTOR WITH FLYWHEEL
C TYPICAL INTERLOCK MOTOR - NO FLYWHEEL - CONTROLLED BY DISTRIBUTOR
D FLYWHEEL ACCELERATION

CARL E. HITTLE
INVENTOR.

BY
ATTORNEY.

United States Patent Office 3,048,754
Patented Aug. 7, 1962

3,048,754
COMBINATION MOTOR CONTROL SYSTEM
Carl E. Hittle, North Hollywood, Calif., assignor to Radio Corporation of America, a corporation of Delaware
Filed June 30, 1959, Ser. No. 824,020
7 Claims. (Cl. 318—42)

This invention relates to motor control systems, and particularly to a control system for a dual type of motor having synchronous and interlock sections.

For various uses, and particularly in motion picture production where combination motors are used for recording and reproducing sound, it is desirable to provide a film drive which may operate as an individual unit or in which many units are operated synchronously and in phase with one another. To facilitate the power requirements for such a system, a dual type of motor is desirable, such a motor including a common frame for two rotors on a common shaft. One section of the dual motor unit is a synchronous motor, generally of the salient pole type, and the other is an interlock motor which is driven from a distributor.

In motion picture recording and reproducing equipment, a synchronous motor is used to advance film when only one recording is to be made or when it is desirable to reproduce a previous recording to ascertain whether or not the recording is satisfactory. The interlock motor power is used only when it is desired to operate more than one recorder and/or reproducer in phase interlock so as to keep all interlock motors running in exact phase relationship and the recorded or reproduced sounds maintained in exact relationship to one another. In the latter type of operation, an interlock distributor provides the required power to maintain all of the motors in the system in exact power phase relationship.

In the interlock condition of operation, one phase of the power supply is impressed on the distributor and interconnected motors to lock the rotors in certain pole positions. In the event that the rotor poles are considerably displaced from their lock-up pole positions, the rotor of any motor with a flywheel fixedly mounted on its shaft will continue to rotate past its lock-up position if rapidly rotated to its lock-up position because of the flywheel inertia, the motor then operating as an induction motor and possibly running away.

The present invention is a control system which provides the desired flywheel effect to reduce acceleration and reduce the rate of deceleration when the motor unit is operated as a salient pole motor but permits the rotor to rotate to its lock-up pole position substantially free of the flywheel inertia.

The principal object of the invention, therefore, is facilitate the operation of combination motor units.

Another object of the invention is to provide an improved multiple combination motor unit, each unit of which may be operated singly with desired flywheel stabilization while avoiding the flywheel effect when operated as an interlock motor system.

A further object of the invention is to provide an improved stabilizing system for a motor unit having synchronous and interlock sections but which permits normal lock-up of the interlock sections when operated as an interlock system.

A better understanding of this invention may be had from the following detailed description when read in connection with the accompanying drawings, in which:

FIG. 1 is a diagrammatic view of a multiple unit motor system embodying the invention;

FIG. 2 is a detailed view of one type of flywheel connection between a dual motor unit and a flywheel;

Figure 4:
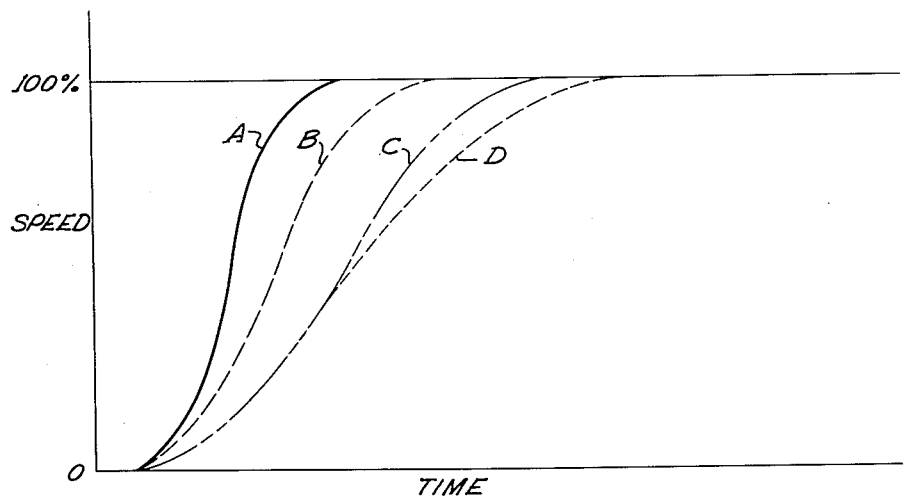
FIG. 4 is a graph showing the starting curves for motors under different conditions.

Referring now to the drawings, in which the same reference numerals indicate like elements, a pair of dual type motor units 5 and 6 are shown with a synchronous motor section 8, of the salient pole type, and an interlock section 9 of the interlock type for unit 5, and a salient pole section 11 and interlock section 12 for unit 6. Mounted on a shaft 14 of unit 5 is a flywheel unit 15, and mounted on shaft 16 of unit 6 is a flywheel unit 17. One of these units is shown in detail in FIG. 2 and will be described hereinafter.

The system shown in FIG. 1 also includes a distributor 19 connected to a power source over conductors 20. The rotor of the distributor 19 is connected over conductors 22 and conductors 23 to the rotor of interlock section 9 and over conductors 22 and conductors 24 to interlock section 12 of unit 6. The stator of interlock section 9 is connected to the power supply over conductors 26 and 27, and the interlock section 12 is connected to the power supply over conductors 26 and 28. The salient pole section 8 is connected to a power source over conductors 30 and 31, and the salient pole section 11 is connected to the power source over conductors 30 and 32. The unit 5 is connected through a gear reduction box 34 to a sprocket 35, while the unit 6 is connected through a gear box 36 to a sprocket 37. The sprockets 35 and 37 may be part of film advancing mechanisms. When it is desired to operate either one of the synchronous salient pole sections of units 5 or 6 independently, switch 40 will be closed to operate unit 5, and switch 41 will be closed when it is desired to operate unit 6.

However, to operate the two units 5 and 6 as an interlock motor system, the switches 40 and 41 are opened and power is supplied to the distributor and interlock sections 9 and 12 over the circuits mentioned above. One phase of the stators is energized by closing the upper switch section 46 of switch 45 until the units 5 and 6 are in their lock-up positions, after which the section 44 of the switch 45 is closed and rotation of the rotors begins.

To show the starting characteristics of the various units, reference is made to FIG. 4 wherein the speed of the rotors is plotted against time. In this graph, it will be noted that curve A is an acceleration curve for a typical synchronous salient pole motor, while curve B is for the same motor with flywheel loading on its rotor shaft. Curve C is a typical acceleration curve for an interlock motor with no flywheel but under the control of a distributor, while curve D is an acceleration characteristic curve for the flywheel attached in accordance with the present invention.

Figure 3:
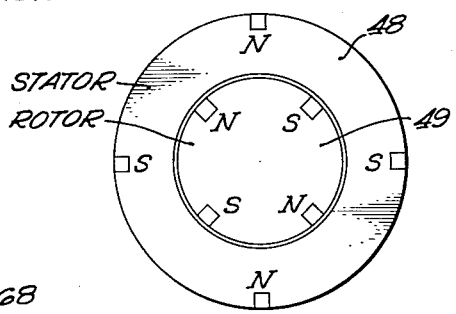
FIG. 3 is a diagrammatic view of one possible rest position of the rotor and stator of a dual motor unit.

When the interlock section of the motor is used, the flywheel effect is not required, since the rate of acceleration is less than that of the salient pole motor with a flywheel. However, at the time of single phase lock-up of the motor system, the rate of acceleration for several degrees of rotor rotation is steeper than that shown in curve A. Thus, if the flywheel were solidly coupled to the rotor under such conditions, the inertia effect generated when the rotors were moved to their lock-up positions would cause the rotors to rotate rapidly past their normal lock-up positions and continue to rotate as induction motors. It is to be understood that the pole positions could be such that no rotor rotation occurs at lock-up. However, one setting of the rotor and stator which could cause run-away is shown in FIG. 3 wherein a stator 48 is shown with two north and south poles, and a rotor 49 is shown with two north and south poles. In this rest position, the south poles and north poles of the rotor are slightly past the center position between the poles of the stator so that when the stator is energized, the rotor will rapidly move so that the south poles thereof are aligned with the north poles of the stator, and the north poles of the rotor are aligned with the south poles of the stator. With a solid flywheel attached to the rotor shaft, the inertia thereof would cause the poles to pass their lock-up positions and the motor would rotate as an induction motor and not lock up.

Referring, now, to FIG. 2, the lower end of a vertical dual type unit 51 is shown having a flywheel unit shown generally at 52 and mounted on a rotor shaft 53 of the unit 51. A set screw 55 holds a disc 56, which may be of metal or similar material, on the lower end of the shaft 53. Glued, or otherwise suitably affixed to the face of disc 56, is a disc 58 of leather, fiber, or similar material. On an anti-friction bearing 60 is mounted a flywheel 61 which rests on the disc 58 with a frictional contact dependent upon the weight of the flywheel. With such a unit, the shaft 53 may be rapidly rotated, the flywheel slipping on the disc 58 and rotating on bearing 60. However, due to the frictional connection between the disc 58 and flywheel 61, the flywheel will eventually attain the speed of the disc 56 at the rate shown in curve D.

Figure 5:
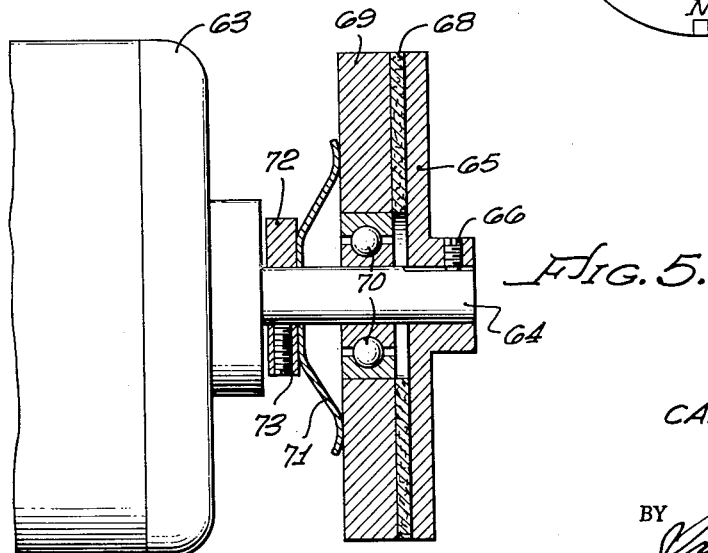
FIG. 5 is a detailed view of another type of connection between the flywheel and shaft of a dual motor unit.

Referring, now, to FIG. 5, a flywheel unit for a horizontal dual motor unit is shown, one end 63 of the unit being illustrated. On the shaft 64 of the unit is mounted a disc 65, similar to disc 56 of the unit shown in FIG. 2, and fastened to the shaft by a set screw 66. The disc 65 has a frictional disc 68 glued to one surface thereof, the other surface of disc 68 being in contact with a flywheel 69 mounted on an anti-friction bearing 70. To provide the desired frictional contact between the friction disc 68 and the flywheel 69, the flywheel 69 is under pressure of a spider spring 71 held in position by a collar 72 and set screw 73. In the unit in FIG. 5, the spring substitutes for gravity in the modification shown in FIG. 2.

The above system, with its frictionally mounted flywheel unit, has the above-mentioned advantages; namely, when a unit operates as a synchronous salient pole motor, the flywheel effect reduces the acceleration rate and also the rate of deceleration, as shown by curve B in FIG. 4. The other advantage is that while the flywheel provides the above advantages, it also permits safe interlocking of the rotors of all the interlock motors without danger of "run-away" operation.

The control is simple, economical to manufacture and install, and makes practical the use of dual type motor units.

I claim:

1. A multiple motor control system comprising a plurality of motor units, each of said units having a synchronous motor section rotor and an interlock motor section rotor on the same shaft, a distributor connected to the interlock sections of said plurality of motor units, means for separately supplying power to each of the synchronous sections of said motor units for operating each of said units as synchronous motors, means for simultaneoouly supplying power to said distributor and said interlock sections of said plurality of motor units, and separate means connected to the rotor shafts of each of said plurality of motor units for controlling the acceleration and deceleration of said units when operated as synchronous motors and for substantially unaffecting the single phase lock-up operation of said plurality of motor units when the interlock sections of said plurality of motor units are energized.

2. A multiple motor control system comprising a plurality of motor units, each of said units having a synchronous motor section rotor and an interlock motor section rotor on the same shaft, a distributor connected to the interlock sections of said plurality of motor units, means for separately supplying power to each of the synchronous sections of said motor units for operating each of said units as synchronous motors, means for simultaneously supplying power to said distributor and said interlock sections of said plurality of motor units, and separate means connected to the rotor shafts of each of said plurality of motor units for controlling the acceleration and deceleration of said units when operated as synchronous motors and for substantially unaffecting the single phase lock-up operation of said plurality of motor units when the interlock sections of said plurality of motor units are energized, said last-mentioned means each including a flywheel frictionally connected to the associated rotor shaft.

3. A multiple motor control system in accordance with claim 2 in which a friction disc is in contact with said flywheel, the frictional connection between said disc and said flywheel being dependent on the weight of said flywheel.

4. A multiple motor control system in accordance with claim 2 in which a friction disc is in contact with said flywheel, a resilient element being provided for urging said flywheel toward said disc.

5. A multi-motor unit control and starting system comprising a plurality of motor units, each of said units including a synchronous motor section and an interlock motor section, the rotors of both sections being mounted on the same shaft, means for impressing power on said synchronous motor sections either separately or at the same time, a distributor for said interlock motor sections of said plurality of motor units, means for simultaneously impressing energy on one phase of said distributor and one phase of said interlock sections of said plurality of motor units to lock said interlock sections in certain positions with respect to one another, means for impressing energy on the other two phases of said distributor and interlock sections of said motor units to rotate said interlock sections in synchronism, and means attached to the shaft of each of said plurality of motor units for permitting rapid movement of said rotor shafts to interlock positions when said one phase of each of said distributor and said interlock sections is energized, said last-mentioned means stabilizing said rotors when each of said units is operated at normal speed as a synchronous motor.

6. A multi-motor unit control and starting system comprising a plurality of motor units, each of said units including a synchronous motor section and an interlock motor section, the rotors of both sections being mounted on the same shaft, means for impressing power on said synchronous motor sections either separately or at the same time, a distributor for said interlock motor sections of said plurality of motor units, means for simultaneously impressing energy on one phase of said distributor and one phase of said interlock sections of said plurality of motor units to lock said interlock sections in certain positions with respect to one another, means for impressing energy on the other two phases of said distributor and interlock sections of said motor units to rotate said interlock sections in synchronism, and means attached to the shaft of each of said plurality of motor units for permitting rapid movement of said rotor shafts to interlock positions when said one phase of each of said distributor and said interlock sections is energized, said last-mentioned means each including a friction disc fixedly connected to its associated said shaft and a flywheel in contact with each disc, the weight of said flywheel providing frictional contact between said disc and said flywheel, said last-mentioned means stabilizing said rotors when each of said units is operated at normal speed as a synchronous motor.

7. A multi-motor unit control and starting system comprising a plurality of motor units, each of said units including a synchronous motor section and an interlock motor section, the rotors of both sections being mounted on the same shaft, means for impressing power on said synchronous motor sections either separately or at the same time, a distributor for said interlock motor sections of said plurality of motor units, means for simultaneously impressing energy on one phase of said distributor and one phase of said interlock sections of said plurality of motor units to lock said interlock sections in certain positions with respect to one another, means for impressing energy on the other two phases of said distributor and interlock sections of said motor units to rotate said interlock sections in synchronism, and means attached to the shaft of each of said plurality of motor units for permitting rapid movement of said rotor shafts to interlock positions when said one phase of each of said distributor and said interlock sections is energized, said last-mentioned means each including a friction disc fixedly connected to its associated said shaft, a flywheel in contact with each disc, and a spring for controlling the frictional contact between each disc and its associated flywheel, said last-mentioned means stabilizing said rotors when each of said units is operated at normal speed as a synchronous motor.

References Cited in the file of this patent

UNITED STATES PATENTS

| | | |
|---|---|---|
| 2,354,329 | Miller | July 25, 1944 |
| 2,412,656 | Sharp | Dec. 17, 1946 |
| 2,476,873 | Jeffers | July 19, 1949 |
| 2,847,626 | Pettus | Aug. 12, 1958 |